US011336535B2

(12) United States Patent
Choi et al.

(10) Patent No.: US 11,336,535 B2
(45) Date of Patent: May 17, 2022

(54) STATION MOVEMENT FLOW DRIVEN AUTOMATIC RF SITE GROUPING

(71) Applicant: Cisco Technology, Inc., San Jose, CA (US)

(72) Inventors: Young Il Choi, San Jose, CA (US); Vishal S. Desai, San Jose, CA (US); Santosh Babaji Kulkarni, Sunnyvale, CA (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 9 days.

(21) Appl. No.: 16/358,689

(22) Filed: Mar. 19, 2019

(65) Prior Publication Data

US 2020/0304378 A1    Sep. 24, 2020

(51) Int. Cl.
| | | |
|---|---|---|
| *H04L 12/24* | (2006.01) |
| *G06N 20/00* | (2019.01) |
| *H04W 84/12* | (2009.01) |
| *H04L 41/14* | (2022.01) |
| *H04L 41/0806* | (2022.01) |
| *H04L 41/16* | (2022.01) |
| *H04L 41/147* | (2022.01) |

(52) U.S. Cl.
CPC ......... *H04L 41/145* (2013.01); *G06N 20/00* (2019.01); *H04L 41/0806* (2013.01); *H04L 41/147* (2013.01); *H04L 41/16* (2013.01); *H04W 84/12* (2013.01)

(58) Field of Classification Search
CPC .......................... G06F 11/3006; G06N 20/00
See application file for complete search history.

(56) References Cited

U.S. PATENT DOCUMENTS

| | | | |
|---|---|---|---|
| 5,222,249 A | 6/1993 | Carney | |
| 2008/0186933 A1 | 8/2008 | Willman et al. | |
| 2008/0293405 A1 | 11/2008 | Meyer | |
| 2011/0159847 A1* | 6/2011 | Sun ........................ | H04W 48/12 455/411 |
| 2013/0237215 A1* | 9/2013 | Vashi ...................... | H04W 8/22 455/432.3 |
| 2014/0099971 A1* | 4/2014 | Lim ........................ | G01S 5/0263 455/456.1 |
| 2014/0274037 A1* | 9/2014 | Ganu ...................... | H04W 8/14 455/432.3 |
| 2016/0092772 A1* | 3/2016 | Srivastava ............ | G06F 16/951 706/12 |

(Continued)

*Primary Examiner* — Phirin Sam
*Assistant Examiner* — Debebe A Asefa
(74) *Attorney, Agent, or Firm* — Patterson + Sheridan, LLP

(57) ABSTRACT

Techniques for dynamic RF site configuration are provided. Historical association data is collected from a plurality of access points in a physical environment, and a machine learning model is trained to predict future association events, based on the historical association data. Current association data is then collected from the plurality of access points, and at least one predicted association event is generated by processing the current association data using the trained machine learning model. The plurality of access points is allocated to a plurality of radio frequency (RF) sites based on the at least one predicted association event. Finally, at least one of the plurality of RF sites is configured based on the predicted association event.

20 Claims, 9 Drawing Sheets

(56) References Cited

U.S. PATENT DOCUMENTS

| | | | |
|---|---|---|---|
| 2017/0230267 A1* | 8/2017 | Armolavicius | H04L 41/20 |
| 2017/0272313 A1* | 9/2017 | Rengarajan | H04L 41/142 |
| 2018/0124646 A1 | 5/2018 | Thubert et al. | |
| 2018/0295548 A1 | 10/2018 | Kumar et al. | |
| 2019/0364492 A1* | 11/2019 | Azizi | H04W 52/0264 |
| 2020/0065216 A1* | 2/2020 | Savalgi | G06F 9/5072 |

\* cited by examiner

STATION MOVEMENT FLOW DRIVEN AUTOMATIC RF SITE GROUPING

TECHNICAL FIELD

Embodiments presented in this disclosure generally relate to RF sites. More specifically, embodiments disclosed herein relate to use of machine learning to predict station movement to generate dynamic RF site configurations.

BACKGROUND

In many wireless local area network (WLAN) deployments, supporting full station mobility is a key goal. In order to avoid gaps or holes in the deployment, the density of such systems (e.g., in terms of the number of access points (APs) deployed, or the distance between access points) has increased. This increased density has led to a significant increase in signal density. Further, in many deployments, WLAN broadcast is enabled on all or most of the APs, even though a relatively small segment of the site will actually be used by a given set of clients. These broadcast WLANs increase overhead contention, as client devices repeatedly send broadcast probes. Additionally, simply disabling broadcast can lead to association complexity, as client devices would be forced manually create a WLAN profile prior to association. Furthermore, current deployments are incognizant of station mobility patterns, resulting in suboptimal handoff between APs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
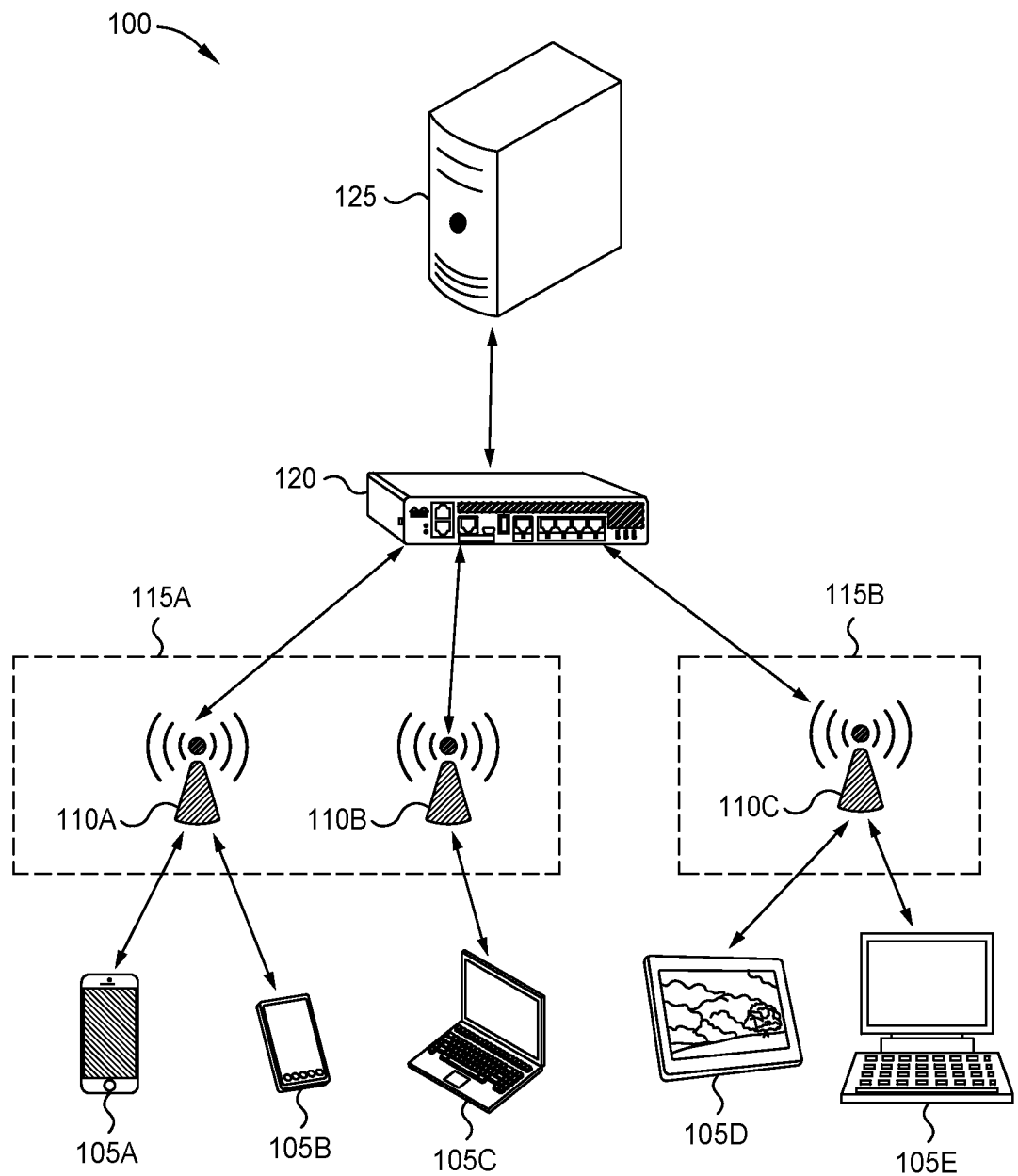
FIG. 1 illustrates an environment including a configuration device configured to dynamically configure RF sites, according to one embodiment disclosed herein.

According to one embodiment presented in this disclosure, a method is provided. The method includes collecting historical association data from a plurality of access points in a physical environment, and training a machine learning model to predict future association events, based on the historical association data. The method further includes collecting current association data from the plurality of access points. Additionally, the method includes generating at least one predicted association event by processing the current association data using the trained machine learning model. The plurality of access points are then allocated to a plurality of radio frequency (RF) sites based on the at least one predicted association event. Finally, the method includes configuring at least one of the plurality of RF sites based on the predicted association event.

According to a second embodiment presented in this disclosure, a computer product is provided. The computer product comprises logic encoded in a non-transitory medium, the logic executable by operation of one or more computer processors to perform an operation. The operation includes collecting historical association data from a plurality of access points in a physical environment, and training a machine learning model to predict future association events, based on the historical association data. The operation further includes collecting current association data from the plurality of access points. Additionally, the operation includes generating at least one predicted association event by processing the current association data using the trained machine learning model. The plurality of access points are then allocated to a plurality of radio frequency (RF) sites based on the at least one predicted association event. Finally, the operation includes configuring at least one of the plurality of RF sites based on the predicted association event.

According to a third embodiment presented in this disclosure, a system is provided. The system includes one or more computer processors, and logic encoded in a non-transitory medium, the logic executable by operation of the one or more computer processors to perform an operation. The operation includes collecting historical association data from a plurality of access points in a physical environment, and training a machine learning model to predict future association events, based on the historical association data. The operation further includes collecting current association data from the plurality of access points. Additionally, the operation includes generating at least one predicted association event by processing the current association data using the trained machine learning model. The plurality of access points are then allocated to a plurality of radio frequency (RF) sites based on the at least one predicted association event. Finally, the operation includes configuring at least one of the plurality of RF sites based on the predicted association event.

EXAMPLE EMBODIMENTS

Embodiments of the present disclosure enable dynamic generation and configuration of RF sites based on movement patterns of client devices (also referred to herein as user equipment, user devices, and stations). In an embodiment, a given physical site can be served by a Wi-Fi deployment that includes any number of access points (APs), providing any number of WLANs (e.g., SSIDs or BSSIDs). For example, in a university setting, a physical campus may include one or more APs in each building or on each floor of a building. Further, in an embodiment, the APs may provide multiple WLANs (e.g., a "students" WLAN, a "faculty" WLAN, a "visitors" WLAN, and the like). Of course, similar deployments can be found in offices, convention centers, stadiums, and in any other physical space.

In some embodiments of the present disclosure, radio frequency (RF) sites are configured to reduce congestion and contention in the deployment, and improve quality of service (QoS). In an embodiment, an RF site is a logical segmentation of the system, where the RF site includes a set of APs, in order to modify WLAN parameters and RF configurations. In embodiments, RF sites differ from AP groups in several ways. For example, in one embodiment, an AP group is a set of access points that all provide the same set of one or more WLANs (e.g., an AP group for a "students," WLAN, an AP group for a "faculty" WLAN and a "staff" WLAN, and the like). Similarly, in embodiments, each access point in an AP group can be in any location, and need not be located physical near other points in the AP group. In contrast, in one embodiment, an RF site is closely related to a physical area, and includes access points that are physically close to each other (e.g., such that each access point in the RF site can see/receive the RF signal from the other points in the RF site). In embodiments, movement of client devices through the physical space is determined, and RF sites can be generated (e.g., the APs can be divided into logical RF sites). Further, in some embodiments, each RF site can be configured based on the particular client devices expected. In one embodiment of the present disclosure, association data is collected from the APs in the deployment. For example, in one embodiment, the set of client devices connected or associated with each AP in the deployment are identified, and their movement patterns are monitored. In some embodiments, the characteristics and capabilities of each client device are also monitored, to aid configuring the RF sites.

In some embodiments, machine learning is used to predict client movement through the space, and the predicted movement patterns are used to generate and configure the RF sites. In an embodiment, the set of APs in the deployment can be represented as a set $AP=\{a_1, a_2, a_3, \ldots a_n\}$. Further, the sequence of APs that a client has associated with can be represented as $H=\{a'_1, a'_2, \ldots a'_k\}$. Suppose further that the sequence of APs that the client will connect to in the future is $F=\{a''_1, a''_2, \ldots a''_m\}$. In an embodiment, one or more machine learning models are trained to receive all or a portion of H (e.g., one or more historical AP associations), and generate all or a portion of F (e.g., one or more predicted future associations). In embodiments, the machine learning model generates predicted associations (e.g., a list of APs that the client may connect to at some point in the future) or predicted roam events (e.g., a handoff from one AP to the next).

In embodiments of the present disclosure, the dynamic RF sites in a physical site can change over time, both throughout the day (e.g., as client devices move through the space), as well as based on improvements to the model (e.g., from ingesting additional data). In one embodiment, transitions between APs within a single RF site can be simpler and less computationally expensive, as compared to transitions to a different RF site. Further, in some embodiments, the specific WLAN configuration and RF configuration can be modified based on the expected client load. For example, in one embodiment, one or more WLANs can be selectively disabled or enabled (or broadcast can be enabled or disabled) for each RF site, based on the client devices that connect to the RF site (e.g., based on which WLAN(s) the client devices attempt to connect to while in the corresponding physical area). Similarly, in some embodiments, the data rate, channel width, signal band, and the like can be modified based on the anticipated client devices for each RF site (e.g., based on what protocols they support, the type of devices, and the like).

FIG. 1 illustrates an environment 100 including a Configuration Device 125 configured to dynamically configure RF sites, according to one embodiment disclosed herein. In the illustrated embodiment, a number of Client Devices 105A-E connect to a WLAN deployment via Access Points 110A-C. Illustratively, the Access Points 110 are controlled by a WLAN Controller 120, which interfaces with the Configuration Device 125. Although illustrated as discrete components, in embodiments, the functionality of the Configuration Device 125 may be implemented locally by the WLAN Controller 120, remotely in the Cloud, or by any suitable device. Further, although illustrated as a distinct component, in one embodiment, the WLAN Controller 120 is implemented as a component on each Access Point 110. In one embodiment, the WLAN Controller 120 is an elastic WLAN controller (eWLC), such as a Cisco Catalyst 9800 Series Wireless Controller.

As illustrated, the Client Devices 105 include smart phones 105A and 105B, laptops 105C and 105E, and a tablet 105D. Of course, the Client Devices 105 are not limited to these examples, and can include any number of computing devices. Similarly, although five Client Devices 105 are included in the illustrated embodiment, there may of course be any number of Client Devices 105 connected to the Wi-Fi deployment. Further, although three Access Points 110 are illustrated, in embodiments, any number of Access Points 110 may be included in the deployment. As illustrated, the Access Points 110 are divided into two RF Sites 115A-B. Specifically, Access Points 110A and 110B are included within RF Site 115A, and Access Point 110C is included within RF Site 115B.

In the illustrated embodiment, the Configuration Device 125 monitors historical associations and roam events of Client Devices 105 in the deployment in order to generate the dynamic RF Sites 115A-B. After determining the appropriate logical segmentation, in an embodiment, the Configuration Device 125 recommends the specific division to the WLAN Controller 120, which implements the division. In one embodiment, the individual Client Devices 105 are not tracked on the device-level (e.g., the Configuration Device 125 does not collect the MAC address or other identifier for each Client Device 105). In such an embodiment, the Configuration Device 125 analyzes the characteristics (e.g., supported protocols, data rates, and the like) of the devices associated with each Access Point 110, and generates the proposed RF Sites 115A-B based on these characteristics.

In some embodiments, the Configuration Device 125 further generates recommended configurations (e.g., WLAN configurations and RF profile configurations) for each RF Site 115A-B, based on the characteristics of the expected Client Devices 105. For example, in one embodiment, the Configuration Device 125 determines a set of "service" WLANs for each RF Site 115, based on the WLANs that Client Devices 105 in the RF Site 115 are expected to associate with. In some embodiments, each Access Point 110 is configured to broadcast its "service" WLANs. In one embodiment, each Access Point 110 still maintains non-service WLANs (e.g., WLANs that are included in the deployment and may be broadcast by other RF Site(s) 115), but does not broadcast them. In this way, the Access Points 110 in an RF Site 115 can still receive and process probe requests for these un-served WLANs.

In some embodiments, if an Access Point 110 receives a probe request for a WLAN that is not served by the corresponding RF Site 115 (e.g. a probe specifying a service set identifier (SSID) or basic SSID (BSSID) that is not served by the RF Site 115), the client will be unable to connect to the WLAN, but a record of this attempt is transmitted to the Configuration Device 125. In an embodiment, once predefined criteria are satisfied (e.g., once historical demand for a particular un-served WLAN is high enough in the area of the RF Site 115), the Configuration Device 125 adds this WLAN to the list of service WLANs for the RF Site 115, such that Client Devices 105 can connect to it.

In one embodiment, the Configuration Device 125 collects, for each RF Site 115, data about the supported protocols of the associated Client Devices 105 (e.g., 802.11b only, 802.11a, 802.11n, 802.11ac, 802.11ax, etc.), supported data rate(s), supported features (e.g., 802.11v, 802.11k, 802.11r, 802.11u, etc.), and the like. In some embodiments, based on these characteristics, the Configuration Device 125 can recommend different data rates and/or MSC settings. For example, in one embodiment, the Configuration Device 125 can enable a low data rate when the majority of client devices support 802.11b protocol only (e.g., Internet of Things (IoT) devices), or disable low data rates and enable higher data rate when most clients support such high data rate. Similarly, in one embodiment, the Configuration Device 125 can modify the Dynamic Channel Assignment (DCA) Channel list and channel width, based on these characteristics. For example, in one embodiment, the Configuration Device 125 can recommend a 20 Mhz DCA channel when the majority of client devices only support a narrow band width, and use a 40 MHz or higher channel when the clients support 802.11n, 802.11ac, 802.11ax, and the like. In one embodiment, the recommended configurations are determined based on a predefined set of rules that indicate the proper configuration, given a set of client characteristics.

In various embodiments, to predict future associations or roams, the Configuration Device 125 can utilize any number of features or factors, including time of day, day of the week, date, current weather or season, scheduled events, and the like. In this way, the Access Points 110A-C are dynamically grouped into appropriate RF Sites 115A-B based on predicted movement patterns of the Client Devices 105, and each RF Site 115A-B is automatically configured appropriately based on the expected client devices in each area of the site.

Figure 2:
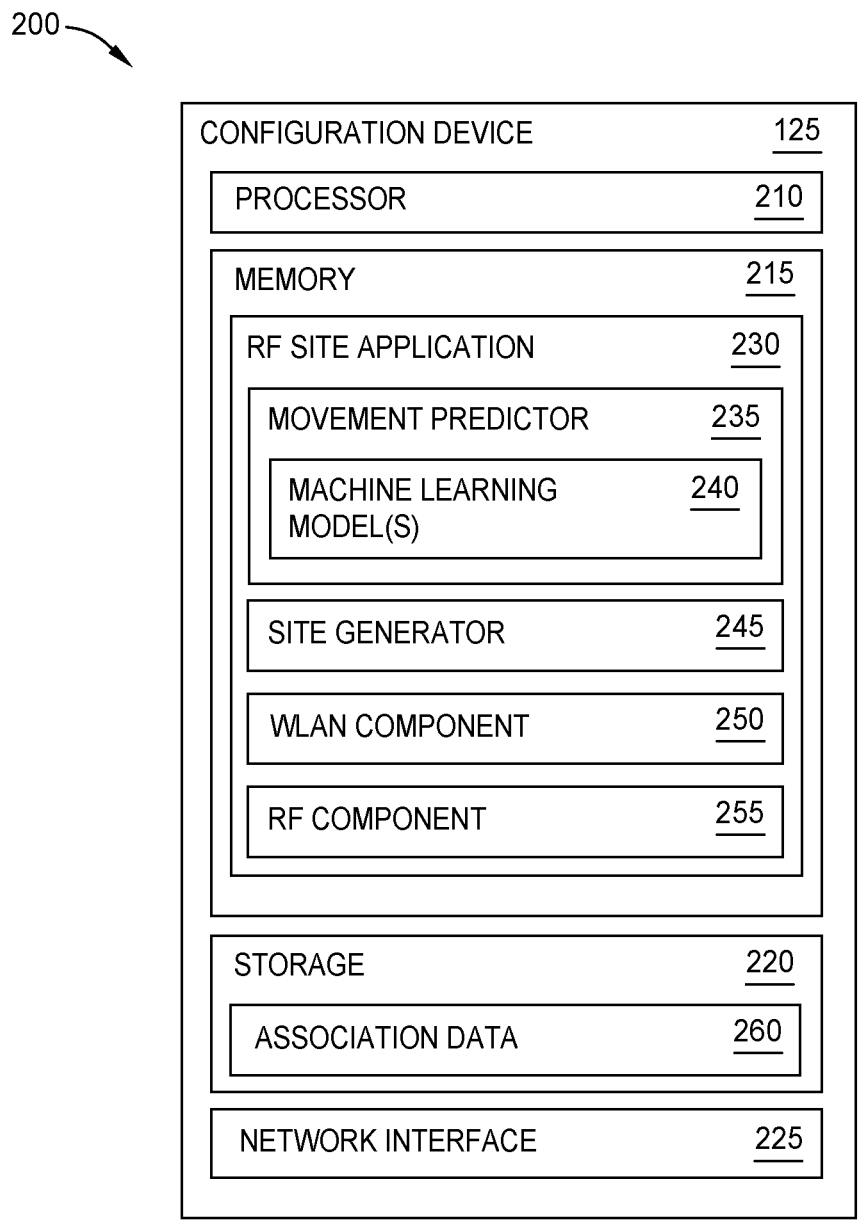
FIG. 2 is a block diagram illustrating a configuration device that can implement dynamic RF sites, according to one embodiment disclosed herein.

FIG. 2 is a block diagram illustrating a Configuration Device 125 that can implement dynamic RF sites, according to one embodiment disclosed herein. As illustrated, the Configuration Device 125 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Via the Network Interface 225, the Configuration Device 125 can be communicatively coupled with other devices including wireless controllers, devices used by administrator to configure the Configuration Device 125, and the like.

In the illustrated embodiment, Storage 220 includes Association Data 260, which is collected from one or more access points. Although illustrated as being stored in Storage 220, in embodiments, the Association Data 260 can reside in any location, including in Memory 215, or on one or more remote devices or storage units (e.g., stored by the WLAN controller, stored in one or more cloud resources, and the like). In an embodiment, the Association Data 260 includes data relating to connections (or connection requests, such as probes) from Client Devices 105 to the one or more Access Points 110. For example, in one embodiment, the Association Data 260 includes records for each new association event (e.g., each time a client device connected or attempted to connect to the access point, or disconnected from an access point) and/or for each roam event (e.g., each time a client device transitioned from a first access point to a second).

In some embodiments, each record in the Association Data includes one or more characteristics of the event, as well as one or more characteristics of the client device. In one embodiment, the characteristics of the event can include, for example, an indication as to the time when the event occurred, an identifier of the access point(s) involved in the association or roam, the WLAN (e.g., the BSSID or SSID) to which the association or roam was directed (e.g., specified in a probe request), and the like. Further, in various embodiments, the characteristics of the client device can include, for example, a list of protocols supported by the device, data rate supported by the device, features supported by the device, and the like. In embodiments, the Association Data 260 includes historical data (e.g., collected in the past). In one embodiment, the Association Data 260 is supplemented with new data as it becomes available (e.g., throughout the day, as devices connect and disconnect from access points).

In one embodiment, the Association Data 260 does not include identifiers (e.g., MAC addresses) of the client devices themselves. In such an embodiment, RF sites can be generated based not on the individual client devices expected to be in the area, but based on the overall device characteristics expected to be in the area. For example, rather than predicting that a specific set of devices will be in the conference room at a specific time, the Configuration Device 125 can predict that the client devices that will be present in the conference room (or the "typical" or "average" device) will, in general, support 802.11a protocol, use a high data rate, and support 802.11v features. Based on this prediction, the Configuration Device 125 can dynamically create RF sites and configure each, without identifying individual devices or users throughout the physical environment.

In the illustrated embodiment, the Memory 215 includes an RF Site Application 230. Although illustrated as a program residing in Memory 215, in embodiments, the functionality of the RF Site Application 230 can be implemented on any suitable device, and may be implemented via hardware, software, or as a combination of hardware and software. As illustrated, the RF Site Application 230 includes a Movement Predictor 235, a Site Generator 245, a WLAN Component 250, and an RF Component 255. Although illustrated as discrete components for clarity, in embodiments, the functionality of the Movement Predictor 235, the Site Generator 245, the WLAN Component 250, and the RF Component 255 may be divided or combined across any number of components and devices.

In embodiments, the Movement Predictor 235 analyzes the Association Data 260 to generate predicted future access points that a client device will connect to (e.g., predicted future association events and/or roam events). In some embodiments, the Movement Predictor 235 does so by using one or more trained Machine Learning Models 240. In some embodiments, the Movement Predictor 235 uses a supervised model such as Random Forest, a Ranking Support Vector Machine (SVM), and the like. In one embodiment, the Movement Predictor 235 utilizes historical Association Data 260 to train the Machine Learning Model(s) 240 to predict, based on a sequence or set of association events, what the next one or more association event(s) are likely to be (e.g., which access points will be involved). In some embodiments, the predicted events also indicate expected characteristics of the client device(s) and/or of the future requests. In one embodiment, the features used by the Machine Learning Model(s) 240 to predict future associations can include the current time of day, date, weather, scheduled events, and the like, as well as the characteristics of the historical association event (e.g., what time they occurred, what day of the week they occurred on, what time of year they occurred on, what the weather was like when they occurred, what SSID was requested, what events were scheduled at that time, and the like). In some embodiments, the features further include characteristics of the corresponding client device (e.g., data rate supported, supported protocols and features, and the like).

In some embodiments, the Movement Predictor 235 reserves a portion of the Association Data 260 to evaluate the Machine Learning Model(s) 240. Once the model(s) reach a predefined level of accuracy (e.g., defined by an administrator), they are deployed into production and used to dynamically generate RF sites in real-time. In an embodiment, while in production, ongoing association data is collected and is used to periodically refine the Machine Learning Model(s) 240. For example, in one embodiment, the Movement Predictor 235 can use newly gathered data to retrain or refine the model(s) each day, week, month, and the like. As above, in such an embodiment, the refined model(s) are deployed to production once they have reached a satisfactory level of accuracy. In this way, the Movement Predictor 235 continually revises its models and ensures the most accurate predictions are available.

In the illustrated embodiment, the Site Generator 245 utilizes the predicted association and/or roam events to dynamically group access points into RF sites. In one embodiment, the Site Generator 245 operates throughout the day to dynamically redefine RF sites as needed (e.g., as predicted client associations change throughout the day). For example, in one embodiment, the Site Generator 245 may determine that an access point in a conference room is expected to be connected to by a number of high data rate devices, while a corresponding drop in connections is expected at a second access point. Based on this information, the Site Generator 245 can generate a dynamic RF site that includes both access points, and reconfigure the conference access point based on the expected devices. In this way, the transition of the devices to the conference room can be less computationally expensive, and can be achieved with less latency.

In an embodiment, once the Site Generator 245 has defined the RF sites, the WLAN Component 250 can similarly use the predicted association/roam events to generate a recommended WLAN configuration for each RF site. For example, in one embodiment, the WLAN Component 250 determines which WLAN(s) (e.g., which BSSIDs or SSIDs) are expected to be requested in the RF site, and configures these SSIDs as "service" WLANs with broadcast enabled. In an embodiment, the remaining WLANs available in the deployment are still configured on the access points in the RF site, but they are configured as non-service or non-broadcast. In one embodiment, probe requests targeted to an unserved SSID are included in the Association Data 260 and used to refine the Machine Learning Models 240, such that future predictions are more likely to include a prediction that the unserved SSID will be requested. In this way, the WLAN Component 250 can, in the future, configure the RF site to serve this SSID.

In one embodiment, in addition to or instead of relying solely on the generated predictions, the WLAN Component 250 similarly monitors probe requests for the RF site. In an embodiment, if the number of probe requests for an unserved SSID exceed a predefined threshold (or a predefined percentage or rate of requests exceeds a threshold), the WLAN Component 250 can dynamically reconfigure the RF site to support the SSID (e.g., to begin broadcasting it). In this way, the Configuration Device 125 can continually reconfigure and redefine the RF sites, in order to better serve the client devices.

In the illustrated embodiment, the RF Component 255 similarly uses the generated predictive association and/or roam events to generate recommended RF profile configurations for each RF site. In one embodiment, the RF Component 255 uses a rules-based system to determine the appropriate RF configuration for the RF site. In one embodiment, the RF Component 255 estimates the amount of traffic that will occur in the RF site (based the historical connectivity requests and/or the predicted future connectivity), and generates a recommended RF configuration that accounts for this traffic. For example, if the amount of traffic expected exceeds a predefined threshold, the RF Component 255 can generate an RF profile to focus on capacity of the network.

In some embodiments, the RF Component 255 generates recommended RF configurations based further on the predicted characteristics of the client devices, as described in the generated predictive association data. For example, in one embodiment, the RF Component 255 determines the number or percentage of predicted associations from client devices that only support 802.11b protocol (e.g., IoT devices). Based on this value, the RF Component 255 can recommend a relatively lower data rate, to accommodate. Further, in one embodiment, if the RF Component 255 determines that the expected client devices will only have 2.4 GHz connectivity, the RF Component 255 can selectively enable a 2.4 GHz band radio and disable any other bands (e.g., the 5 GHz radio), and the like. Similarly, in some embodiments, if all or a majority of the expected devices can support a higher data rate, the RF Component 255 can prepare an RF configuration that enables a high data rate, to better serve these devices.

In another embodiment, the RF Component 255 can determine the band width(s) supported by the expected client devices, and generate an RF profile for the site that includes the appropriate bandwidth for the expected client devices. In some embodiments, the historical association data further indicates the type of traffic at the time, and the generated predictive data similarly includes an expected or anticipated type of traffic. In such an embodiment, the RF Component 255 can similarly modify the RF parameters based on the expected traffic (e.g., video streaming, as opposed to email use). In embodiments, the RF Component 255 can modify any RF parameter in order to ensure that the network best serves the set of expected client devices. In some embodiments, the Configuration Device 125 generates and implements its recommendations without requiring approval from a user or administrator. In one embodiment, however, some or all of the configuration changes must be approved by an administrator prior to being implemented.

Figure 3:
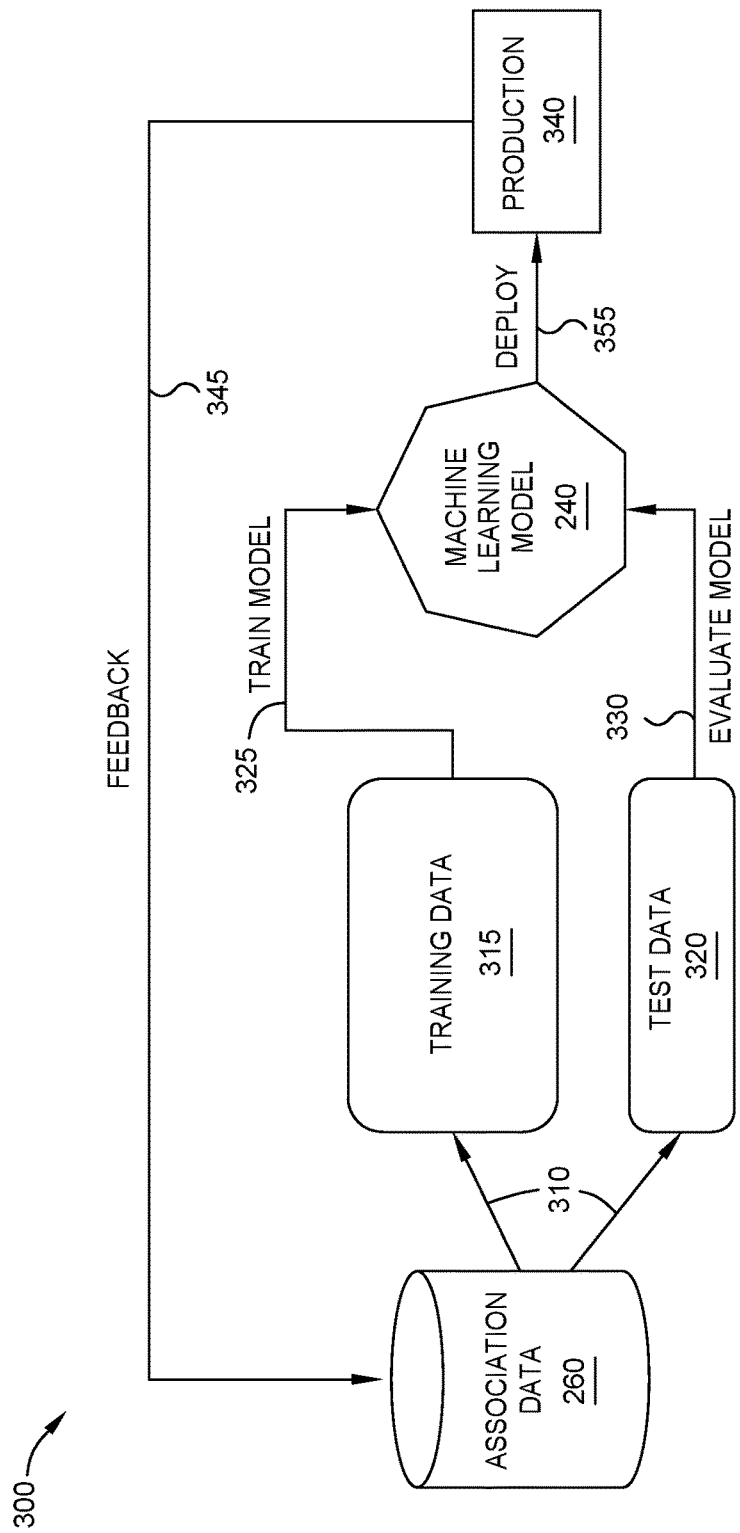
FIG. 3 illustrates a workflow for training, deploying, and refining a machine learning model to predict access point associations, according to one embodiment disclosed herein.

FIG. 3 illustrates a workflow 300 for training, deploying, and refining a machine learning model to predict access point associations, according to one embodiment disclosed herein. In the illustrated embodiment, as depicted by the arrows 310, a set of historical Association Data 260 is divided into a set of Training Data 315 and a set of Test Data 320. As indicated by arrow 325, the Training Data 315 is used to train a Machine Learning Model 240. In one embodiment, training the Machine Learning Model 240 includes providing one or more association events as input, and using one or more subsequent association events as the target output for the model. The weights and connections of the Machine Learning Model 240 can then be revised based on this target output.

In the illustrated embodiment, once the Machine Learning Model 240 has been trained, the Test Data 320 is used to evaluate the model, as depicted by arrow 330. In one embodiment, to evaluate the Machine Learning Model 240, one or more events from the Test Data 320 are provided as input, and the generated output (e.g., predicted future association data) is compared to the actual subsequent association event(s). In an embodiment, if the results differ beyond a predefined threshold (e.g., if more than five percent of the generated results differ from the expected results, or if some aspect of the generated results differs from the actual data), the Machine Learning Model 240 is further trained or refined using additional Training Data 315. In one embodiment, if needed, the Movement Predictor 235 will refrain from deploying the Machine Learning Model 240 until it is sufficiently accurate. In an embodiment, the RF Site Application 230 continues to collect additional Association Data 260, and retrains the Machine Learning Model 240 until it has reached maturity.

As illustrated by arrow 335, once the Machine Learning Model 240 has reached an adequate level of accuracy, the Movement Predictor 235 deploys it into Production 340. In Production 340, the Machine Learning Model 240 is used to generate predicted association data, based on current association data in a physical environment. Further, as illustrated by arrow 345, in one embodiment, while in Production 340, the RF Site Application 230 continues to collect feedback (e.g., new association data as it becomes available), and stores it in the Association Data 260. In this way, the Machine Learning Model 240 can be periodically retrained or refined, in order to generate better predictions.

Figure 4A:
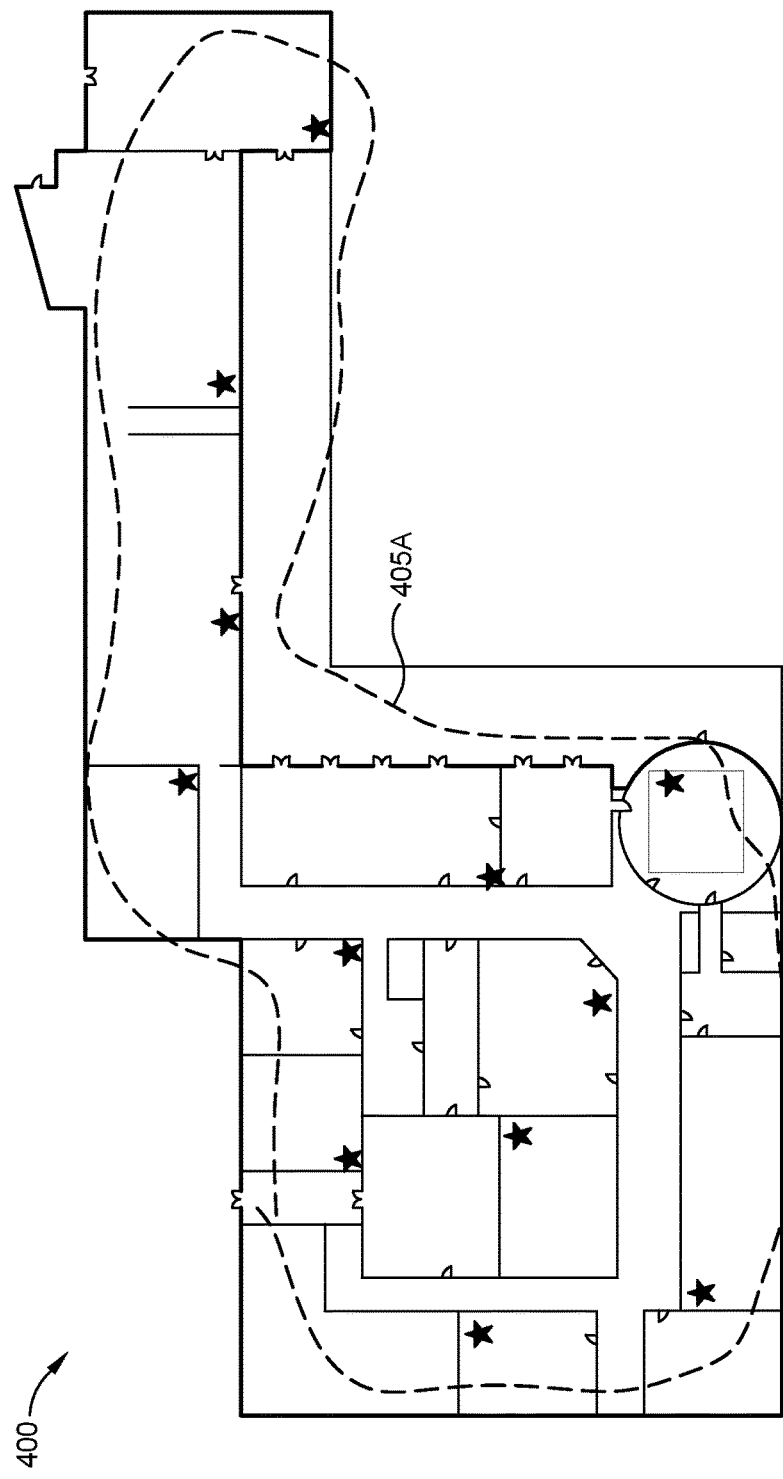
FIGS. 4A-4C illustrate a physical space with a number of access points and dynamically generated and configured RF sites, according to one embodiment disclosed herein.

FIG. 4A illustrates a Building 400 with a number of access points and a dynamically generated and configured RF site, according to one embodiment disclosed herein. Specifically, FIG. 4A depicts a floor plan for an office or other building, as viewed from above. In the illustrated embodiment, access points are illustrated as stars on the floor plan. Illustratively, the Building 400 includes a single RF Site 405A, which encompasses every access point in the Wi-Fi deployment. In embodiments, the space may include a single RF Site 405A for a variety of reasons. For example, in one embodiment, the RF Site Application 230 may not yet have collected sufficient association data in order to make intelligent predictions. In such a case, the RF Site Application 230 can utilize a single RF Site 405A (or a set of user-defined RF sites) until enough Association Data 260 is collected to dynamically generate additional sites.

In another embodiment, the single RF Site 405A may have been intentionally configured by the RF Site Application 230 based on the predicted client movement. For example, in one embodiment, the RF Site Application 230 may simply understand that, given the available features (e.g., the particular time of day, the particular day of the week, the particular time of year, the weather, and the like), the client devices share one or more device characteristics and are likely to be roaming around the Building 400 frequently, making a single large RF Site 405A the best solution.

Figure 4B:
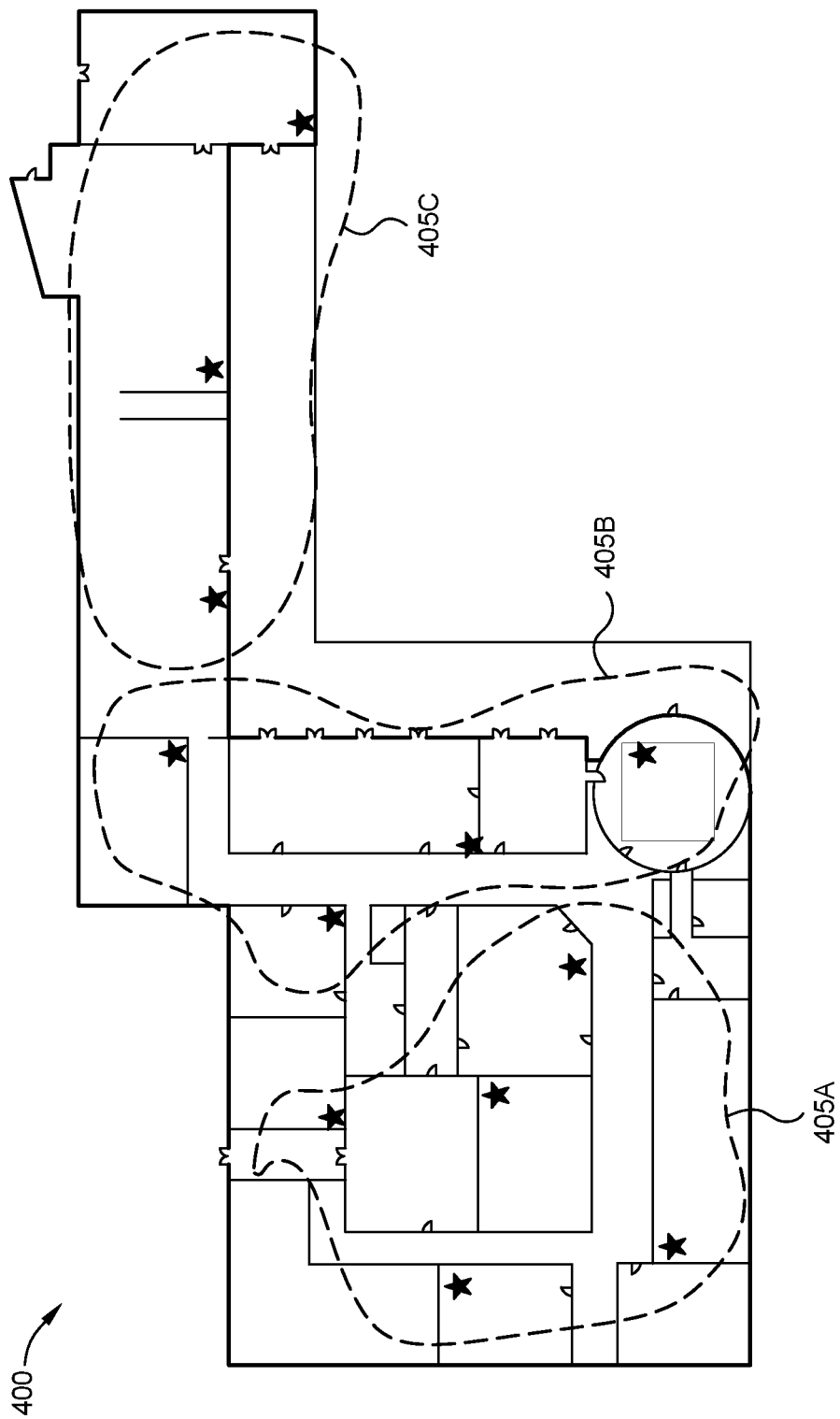
Figure 4C:
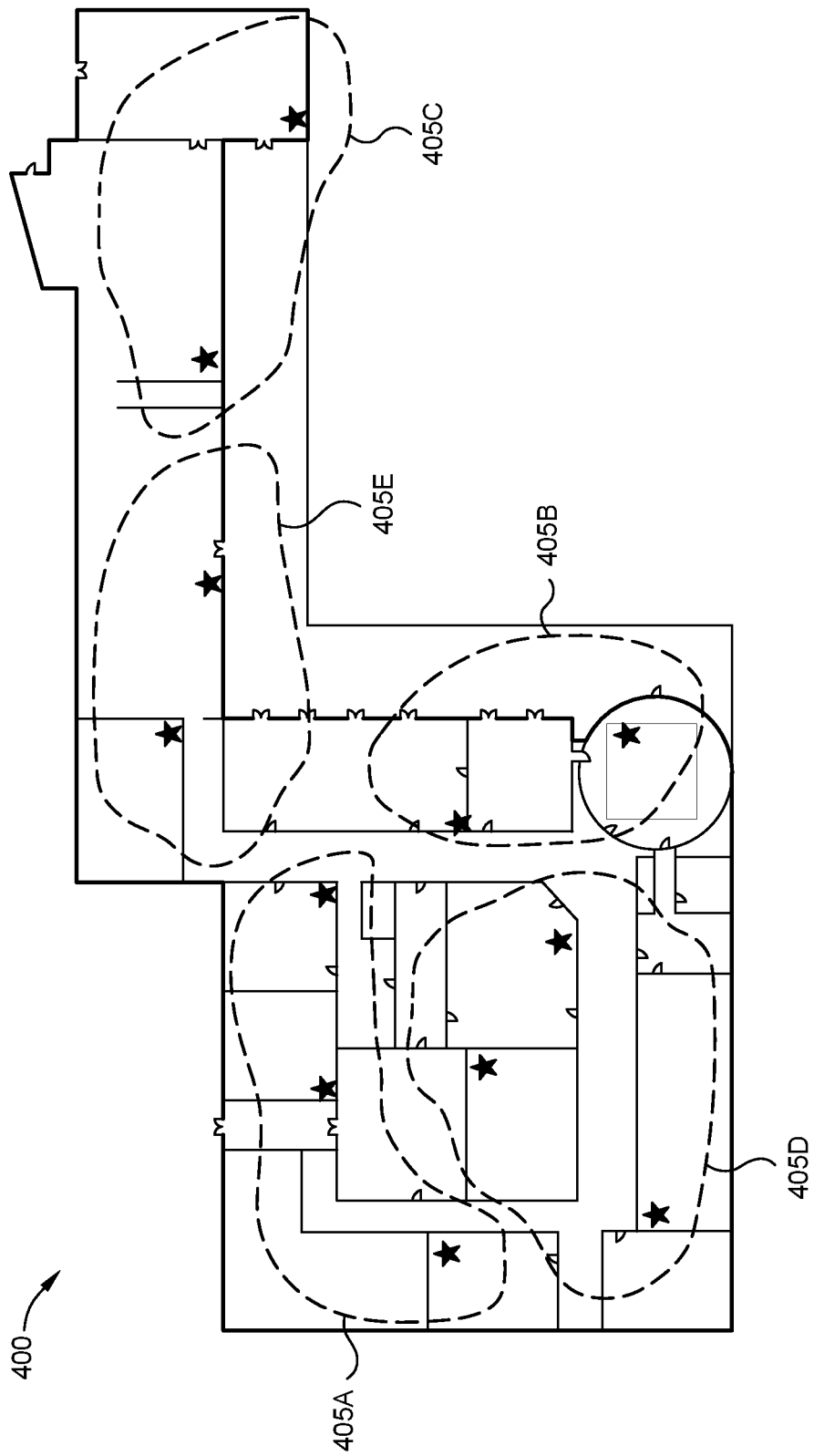

FIGS. 4B and 4C illustrate the same Building 400, but with the access points divided into three RF Sites 405A, 405B, and 405C, and into five RF Sites 405A, 405B, 405C, 405D, and 405E, respectively. In the illustrated embodiments, the RF Site Application 230 has dynamically created these RF Sites 405 based on predicted or anticipated client device movement. That is, in one embodiment, the RF Site Application 230 dynamically creates and configures each RF Site 405, even if no client devices are currently present in a given RF Site 405. Rather than reactively creating or configuring the RF Site 405 based on the clients that are currently connected to the access points, the RF Site Application 230 can proactively create and configure RF Sites 405 that will receive client devices at a point in the future. In this way, when the client devices arrive at the particular area of the Building 400, the RF Sites 405 are already configured and optimized for their use.

Figure 5:
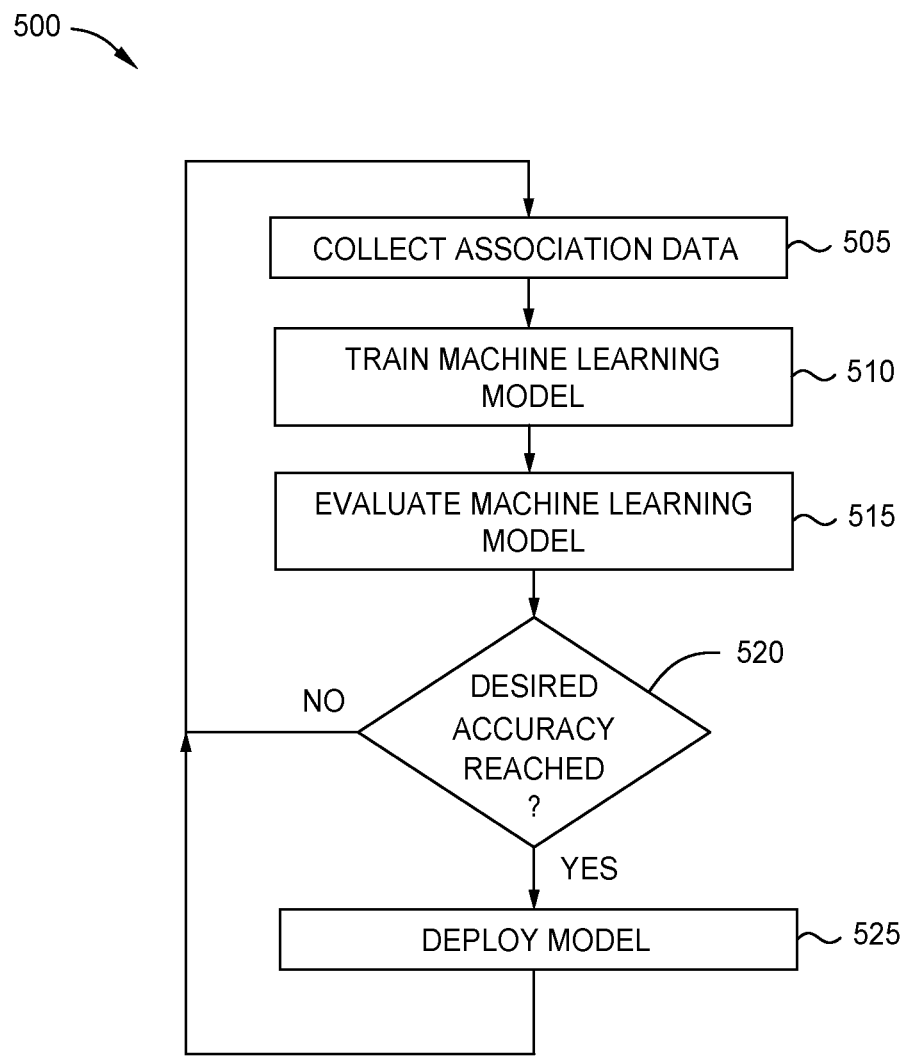
FIG. 5 is a flow diagram illustrating a method of building and refining a machine learning model, according to one embodiment disclosed herein.

FIG. 5 is a flow diagram illustrating a method 500 of building and refining a machine learning model, according to one embodiment disclosed herein. The method 500 begins at block 505, where the RF Site Application 230 collects association data form a set of access points in a deployment (e.g., from a physical environment). In embodiments, the access points may be distributed around any physical space, such as one or more buildings or floors of a building, a campus, a stadium, and the like. In one embodiment, the association data includes information about connections from client devices to the one or more access points. For example, in embodiments, the association data can include information about the connection itself, such as when the connection was initiated and/or when it terminated, what particular WLAN (e.g., SSID or BSSID) the connection was to, whether the connection was successful or was rejected, the type and/or amount of traffic on the connection, and the like. In some embodiments, the association data also includes information about the client device that corresponds to each connection, including supported protocols, data rates, features, and the like. In one embodiment, the association data further includes contextual information about the connection, such as the weather at the time.

The method 500 then continues to block 510, where the RF Site Application 230 trains (or refines) a machine learning model as discussed above. In some embodiments, this training or refining process is completed periodically (e.g., monthly, daily, weekly, and the like). In one embodiment, the model is refined automatically once a sufficient amount of new association data is collected. That is, in one embodiment, the RF Site Application 230 determines how many association or roam events have been collected but not yet ingested into the model. Once this number reaches a predefined value, the RF Site Application 230 can refine the model using the new data. Further, in one embodiment, an administrator determines when the model is to be refined. The method 500 then proceeds to block 515, where the RF Site Application 230 evaluates the model.

In the illustrated embodiment, the RF Site Application 230 reserves a portion of the association data for use as test data to evaluate the machine learning model. In one embodiment, evaluating the machine learning model includes determining a percentage of the predicted association events that align with the actual association events from the test data. For example, in such an embodiment, if predicted future association events or roam events match perfectly with actual association events in the test data, the RF Site Application 230 can determine that the model is aligned. In some embodiments, the RF Site Application 230 considers each aspect of the predicted event. For example, the RF Site Application 230 can determine whether the predicted client characteristics match the actual events, whether the predicted time of the associations match the actual events, and the like.

The method 500 then proceeds to block 520, where the RF Site Application 230 determines whether the desired level of accuracy has been reached. In an embodiment, an administrator can define the minimum level of accuracy preferred before the model is deployed into production. If the accuracy of the machine learning model is insufficient, the method 500 returns to block 505, to continue collecting data and training the model. In one embodiment, if a model has already been deployed, the prior machine learning model is left in its deployed operational state, while the new refined model continues to be trained. If, at block 520, the RF Site Application 230 determines that the model is sufficiently accurate, the method 500 continues to block 525, where the model is deployed. In embodiments, this can include replacing the existing model with the newly refined model. The method 500 then returns to block 505, to continue collecting new data for further refinement of the model.

Figure 6:
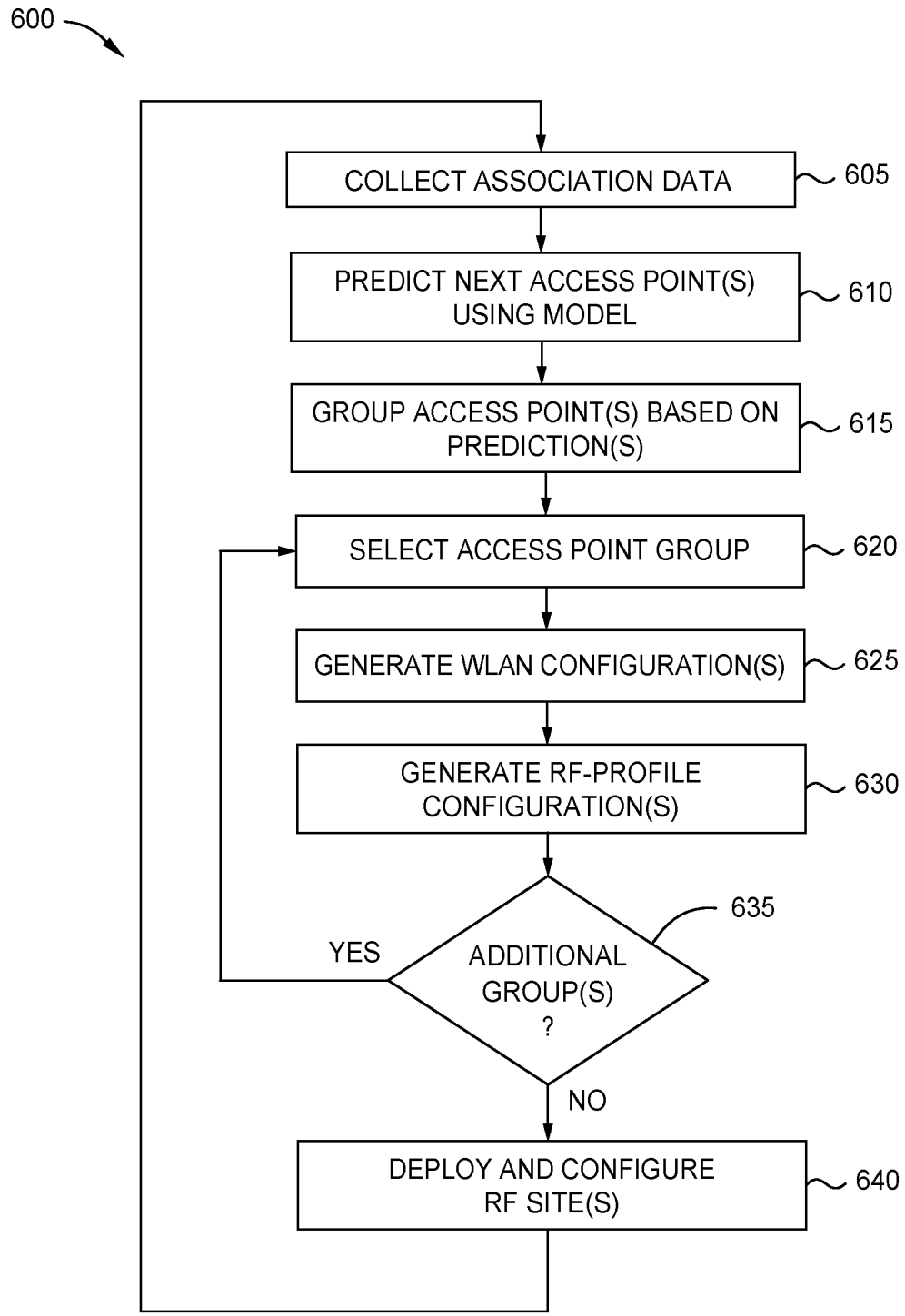
FIG. 6 is a flow diagram illustrating a method of dynamically generating and configuring RF sites, according to one embodiment disclosed herein.

FIG. 6 is a flow diagram illustrating a method 600 of dynamically generating and configuring RF sites, according to one embodiment disclosed herein. The method 600 begins at block 605, where the RF Site Application 230 collects current association data from the set of access points under its control. That is, the RF Site Application 230 collects information about the client devices that are currently connected to the network. In embodiments, this data can include an indication as to which access point each device is connected to, the protocols and features supported by each device, the SSID each device is connected to, and the like. The method 600 then proceeds to block 610, where the RF Site Application 230 predicts one or more future access point(s) that one or more devices will connect to in the future, based on the current association data.

In one embodiment, the RF Site Application 230 processes the current association data using one or more machine learning models to generate the predicted future associations. In one embodiment, the generated predictions indicate which access point(s) client devices will roam to, when the roam will occur, what the characteristics of the client devices connected to each access point will be, what WLANs will be requested at each access point, and the like. In some embodiments, prior to generating the predicted future associations, the RF Site Application 230 groups client devices having similar movement patterns (e.g., as determined based on the historical data), and generates predicted future associations (e.g., future access points) for each such group.

The method 600 then continues to block 615, where the RF Site Application 230 divides the access points into one or more groups based on the generated predictions. For example, suppose the RF Site Application 230 predicts that a number of client devices that are currently connected to a first access point in a first area of the physical space (e.g., an office area) will migrate to a second area (e.g., a cafeteria) at a particular time in the future (e.g., noon). In one embodiment, based on this prediction, the RF Site Application 230 can select one or more access points in the cafeteria and/or office areas, and assign them to a single RF site before the predicted time (e.g., noon). In this way, when the users begin to move to the cafeteria, the access points are pre-configured for them.

At block 620, the RF Site Application 230 selects one of the generated RF sites to be configured. The method 600 then continues to block 625, where the RF Site Application 230 generates a WLAN configuration for the selected RF site. In one embodiment, generating the WLAN configuration includes determining, for each WLAN (e.g., each SSID) that is supported by the Wi-FI deployment, whether to enable or disable broadcast in the selected RF site. For example, in one embodiment, the RF Site Application 230 analyzes the predicted future associations, to determine which SSIDs the client devices are expected to request in the RF site. For example, in a school, a teacher's lounge access point is unlikely to need to broadcast the "students" WLAN. Similarly, in a courthouse with restricted areas, it is unlikely that a "visitors" WLAN will be needed within the judge's chambers. In one embodiment, if any of the client devices are expected to request an SSID, the RF Site Application 230 classifies this SSID as a "service" WLAN for the RF site, and enables broadcast. In some embodiments, the RF Site Application 230 only enables broadcast for WLANs associated with a sufficiently large number or percentage of the expected clients.

In an embodiment, all other WLANs (e.g., SSIDs that are not expected to receive any probe requests within the RF site), are marked as un-served, and broadcast is disabled for them. In this way, contention overhead is reduced, without reducing convenience for the users. The method 600 continues to block 630, where the RF Site Application 230 generates an RF profile configuration for the selected RF site. As discussed above, in some embodiments, the RF Site Application 230 does so by analyzing the generated predictions, and determining the client characteristics that are expected in the selected RF site. The RF Site Application 230 can then generate an RF profile configuration that aligns with these expected characteristics. For example, in embodiments, the RF Site Application 230 can enable or disable particular radios (e.g., 2.4 GHz and 5 GHz), modify the data rate, adjust the channel width, and the like.

The method 600 then proceeds to block 635, where the RF Site Application 230 determines whether there is at least one additional group of access points that has not yet been configured. If so, the method 600 returns to block 620 to select and configure the next RF site. Otherwise, the method 600 continues to block 640, where the RF Site Application 230 deploys and configures the generated RF sites, based on the generated configurations. Notably, in one embodiment, these RF sites are deployed and configured prior to the client devices actually moving to the corresponding area. In this way, the RF sites are pre-configured to best serve the client devices as soon as they arrive at the area covered by the RF site.

Figure 7:
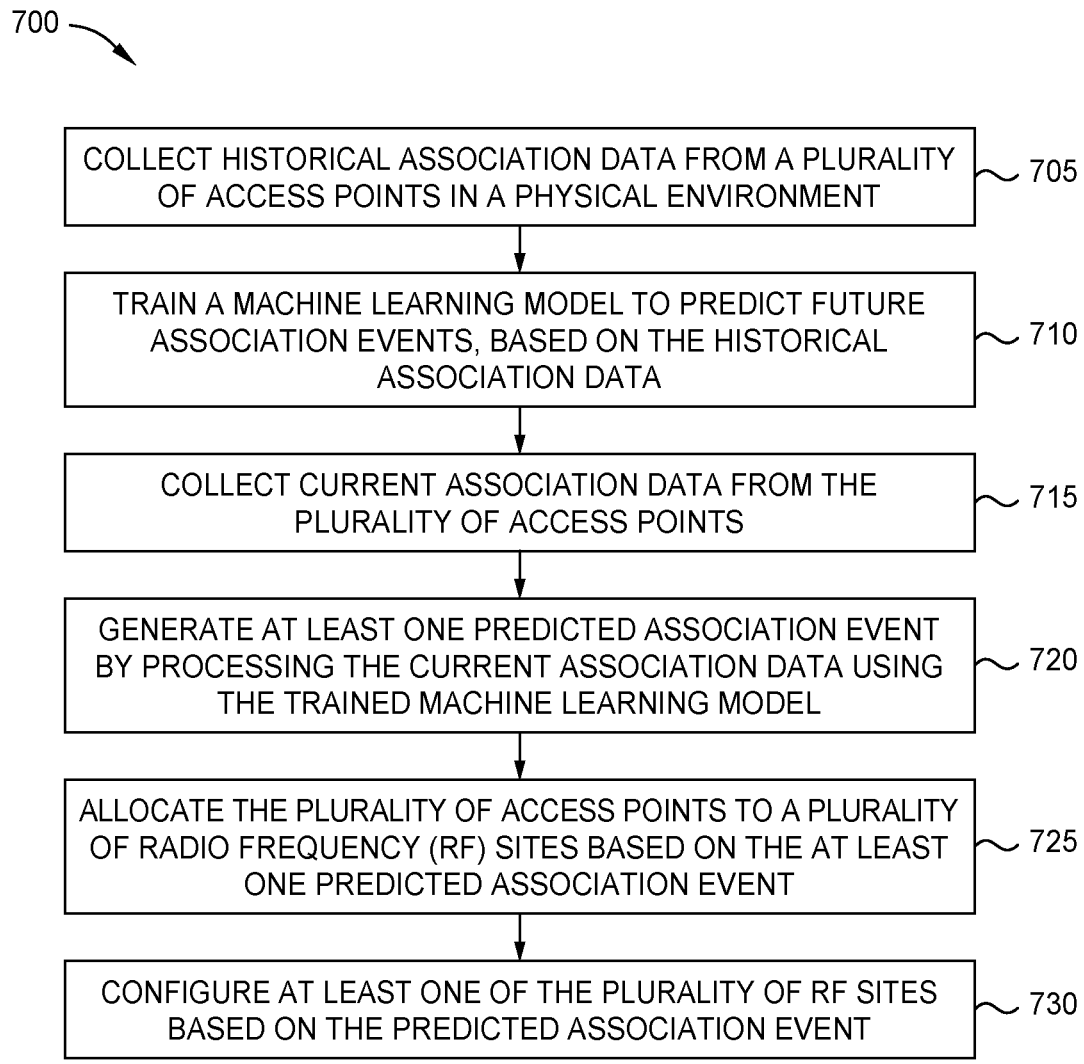
FIG. 7 is a flow diagram illustrating a method of dynamic RF site configuration, according to one embodiment disclosed herein.

FIG. 7 is a flow diagram illustrating a method 700 of dynamic RF site configuration, according to one embodiment disclosed herein. The method 700 begins at block 705, where the RF Site Application 230 collects historical association data from a plurality of access points in a physical environment. At block 710, the RF Site Application 230 trains a machine learning model to predict future association events, based on the historical association data. The method 700 then proceeds to block 715, where the RF Site Application 230 collects current association data from the plurality of access points. At block 720, the RF Site Application 230 generates at least one predicted association event by processing the current association data using the trained machine learning model. The method 700 continues to block 725, where the RF Site Application 230 allocates the plurality of access points to a plurality of radio frequency (RF) sites based on the at least one predicted association event. Finally, at block 730, the RF Site Application 230 configures at least one of the plurality of RF sites based on the predicted association event.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method comprising:
  collecting historical association data from a plurality of access points in a physical environment, wherein the historical association data comprises records for prior roam events among the plurality of access points, wherein each respective roam event corresponds to a transition of a respective client device from a first access point of the plurality of access points to a second access point of the plurality of access points;

training a machine learning model to predict future association events based on the historical association data; the training comprising using one or more records of the historical association data as input and one or more subsequent records of the historical association data as target output to refine the machine learning model;

collecting current association data from the plurality of access points;

generating at least one predicted association event by processing the current association data using the trained machine learning model, wherein:
the at least one predicted association event comprises a prediction that one or more client devices will request to connect to a first access point of the plurality access points at a future time, and
the at least one predicted association event indicates expected data rates of the one or more client devices;

allocating the plurality of access points to a plurality of radio frequency (RF) sites based on the at least one predicted association event; and configuring at least one of the plurality of RF sites to use a suggested data rate, based on the predicted association event and the expected data rates.

2. The method of claim 1, wherein the roam events indicate movement of client devices through the physical environment over time.

3. The method of claim 1, wherein the current association data comprises characteristics of one or more client devices currently connected to or attempting to connect to one or more of the plurality of access points, wherein the characteristics include at least one of:
(i) supported protocols of the one or more client devices;
(ii) supported data rates of the one or more client devices;
(iii) supported features of the one or more client devices; or
(iv) service set identifiers (SSID) that the one or more client devices are connected to or are attempting to connect to.

4. The method of claim 1, wherein generating the at least one predicted association event comprises generating a predicted sequence of access points that one or more client devices will connect to while moving through the physical environment.

5. The method of claim 1, wherein configuring at least one of the plurality of RF sites comprises:
identifying, for a first RF site of the plurality of RF sites, a plurality of attempts by client devices to connect to a first service set identifier (SSID), wherein the first SSID is not serviced by the first RF site; and
upon determining that the plurality of attempts satisfy predefined criteria, configuring the first RF site to service the first SSID.

6. The method of claim 1, further comprising, for each respective RF site of the plurality of RF sites:
identifying a respective set of data rates supported by client devices that are expected to connect to the respective RF site;
determining a respective suggested data rate, based on the respective set of supported data rates; and
configuring the respective RF site to use the respective suggested data rate.

7. The method of claim 1, wherein configuring at least one of the plurality of RF sites comprises:
identifying, for a first RF site of the plurality of RF sites, a set of protocols supported by client devices that are expected to connect to the first RF site; and
determining a suggested channel width, based on the supported set of protocols; and
configuring the first RF site to use the suggested channel width.

8. A computer product comprising logic encoded in a non-transitory medium, the logic executable by operation of one or more computer processors to perform an operation comprising:
collecting historical association data from a plurality of access points in a physical environment, wherein the historical association data comprises records for prior roam events among the plurality of access points, wherein each respective roam event corresponds to a transition of a respective client device from a first access point of the plurality of access points to a second access point of the plurality of access points;
training a machine learning model to predict future association events based on the historical association data; the training comprising using one or more records of the historical association data as input and one or more subsequent records of the historical association data as target output to refine the machine learning model;
collecting current association data from the plurality of access points;
generating at least one predicted association event by processing the current association data using the trained machine learning model, wherein:
the at least one predicted association event comprises a prediction that one or more client devices will request to connect to a first access point of the plurality access points at a future time, and
the at least one predicted association event indicates expected data rates of the one or more client devices;
allocating the plurality of access points to a plurality of radio frequency (RF) sites based on the at least one predicted association event; and
configuring at least one of the plurality of RF sites to use a suggested data rate, based on the predicted association event and the expected data rates.

9. The computer product of claim 8, wherein the roam events indicate movement of client devices through the physical environment over time.

10. The computer product of claim 8, wherein the current association data comprises characteristics of one or more client devices currently connected to or attempting to connect to one or more of the plurality of access points, wherein the characteristics include at least one of:
(i) supported protocols of the one or more client devices;
(ii) supported data rates of the one or more client devices;
(iii) supported features of the one or more client devices; or
(iv) service set identifiers (SSID) that the one or more client devices are connected to or are attempting to connect to.

11. The computer product of claim 8, wherein generating the at least one predicted association event comprises generating a predicted sequence of access points that one or more client devices will connect to while moving through the physical environment.

12. The computer product of claim 8, wherein configuring at least one of the plurality of RF sites comprises:
identifying, for a first RF site of the plurality of RF sites, a plurality of attempts by client devices to connect to a first service set identifier (SSID), wherein the first SSID is not serviced by the first RF site; and upon determining that the plurality of attempts satisfy predefined criteria, configuring the first RF site to service the first SSID.

13. The computer product of claim 8, wherein configuring at least one of the plurality of RF sites comprises:

identifying, for a first RF site of the plurality of RF sites, a set of protocols supported by client devices that are expected to connect to the first RF site; and determining a suggested channel width, based on the supported set of protocols; and configuring the first RF site to use the suggested channel width.

14. The computer product of claim 8, wherein configuring at least one of the plurality of RF sites comprises:

identifying, for a first RF site of the plurality of RF sites, a set of protocols supported by client devices that are expected to connect to the first RF site; and determining a suggested channel width, based on the supported set of protocols; and configuring the first RF site to use the suggested channel width.

15. A system comprising:

one or more computer processors; and logic encoded in a non-transitory medium, the logic executable by operation of the one or more computer processors to perform an operation comprising:

collecting historical association data from a plurality of access points in a physical environment, wherein the historical association data comprises records for prior roam events among the plurality of access points, wherein each respective roam event corresponds to a transition of a respective client device from a first access point of the plurality of access points to a second access point of the plurality of access points;

training a machine learning model to predict future association events based on the historical association data; the training comprising using one or more records of the historical association data as input and one or more subsequent records of the historical association data as target output to refine the machine learning model;

collecting current association data from the plurality of access points;

generating at least one predicted association event by processing the current association data using the trained machine learning model, wherein:

the at least one predicted association event comprises a prediction that one or more client devices will request to connect to a first access point of the plurality access points at a future time, and the at least one predicted association event indicates expected data rates of the one or more client devices;

allocating the plurality of access points to a plurality of radio frequency (RF) sites based on the at least one predicted association event; and configuring at least one of the plurality of RF sites to use a suggested data rate, based on the predicted association event and the expected data rates.

16. The system of claim 15, wherein the roam events indicate movement of client devices through the physical environment over time.

17. The system of claim 15, wherein the current association data comprises characteristics of one or more client devices currently connected to or attempting to connect to one or more of the plurality of access points, wherein the characteristics include at least one of:

(i) supported protocols of the one or more client devices;
(ii) supported data rates of the one or more client devices;
(iii) supported features of the one or more client devices; or
(iv) service set identifiers (SSID) that the one or more client devices are connected to or are attempting to connect to.

18. The system of claim 15, wherein generating the at least one predicted association event comprises generating a predicted sequence of access points that one or more client devices will connect to while moving through the physical environment.

19. The system of claim 15, wherein configuring at least one of the plurality of RF sites comprises:

identifying, for a first RF site of the plurality of RF sites, a plurality of attempts by client devices to connect to a first service set identifier (SSID), wherein the first SSID is not serviced by the first RF site; and upon determining that the plurality of attempts satisfy predefined criteria, configuring the first RF site to service the first SSID.

20. The system of claim 15, the operation further comprising, for each respective RF site of the plurality of RF sites:

identifying a respective set of data rates supported by client devices that are expected to connect to the respective RF site;

determining a respective suggested data rate, based on the respective set of supported data rates; and configuring the respective RF site to use the respective suggested data rate.

* * * * *